United States Patent [19]

Gresh et al.

[11] Patent Number: 4,923,606
[45] Date of Patent: May 8, 1990

[54] PLASTIC-JACKETED FILTER UNDERDRAIN BLOCK

[75] Inventors: Richard D. Gresh, Coraopolis; Robert B. Netherland, Beaver, both of Pa.

[73] Assignee: Tetra Technologies, The Woodlands, Tex.

[21] Appl. No.: 160,637

[22] Filed: Feb. 26, 1988

[51] Int. Cl.$^5$ ............................................. B01D 23/24
[52] U.S. Cl. ................................... 210/275; 210/289; 210/293; 52/309.17
[58] Field of Search ............... 210/274, 275, 289, 291, 210/293; 422/143; 52/309.15, 309.17

[56] References Cited

U.S. PATENT DOCUMENTS

| | | | |
|---|---|---|---|
| 661,336 | 11/1900 | Dyarman. | |
| 1,961,677 | 6/1934 | Serra | 94/11 |
| 2,161,999 | 6/1939 | Christie et al. | 210/148 |
| 2,499,325 | 2/1950 | Miller | 210/293 |
| 2,818,977 | 1/1958 | Crist | 210/291 |
| 2,900,083 | 8/1959 | Oliver | 210/293 |
| 3,080,253 | 3/1963 | Dietz et al. | 52/309.17 |
| 3,339,366 | 9/1967 | Gogan et al. | 61/13 |
| 3,440,788 | 4/1969 | Merget | 52/309.17 |
| 3,468,422 | 9/1969 | Camp | 210/293 |
| 3,762,559 | 10/1973 | Knoy et al. | 210/293 |
| 3,956,134 | 5/1976 | Sturgill | 210/293 |
| 4,064,050 | 12/1977 | Heaney et al. | 210/293 |
| 4,132,043 | 1/1979 | Juba | 52/309.17 |
| 4,707,257 | 11/1987 | Davis et al. | 210/274 |

FOREIGN PATENT DOCUMENTS 296134 12/1966 Australia ............................ 210/293
2632040 1/1978 Fed. Rep. of Germany ... 52/309.17

OTHER PUBLICATIONS

Brochure entitled "Deep-Bed Filter Systems" by Tetra Resources, Inc., 1986.

Primary Examiner—Richard V. Fisher
Assistant Examiner—Coreen Y. Lee
Attorney, Agent, or Firm—Arnold, White & Durkee

[57] ABSTRACT

A precast concrete, plastic-jacketed filter underdrain block for downflow or upflow filter units is disclosed. The plastic jacket additionally functions as a mold for the concrete. The plastic molds become an integral part of the finished filter underdrain block. Thus, relatively lightweight, inexpensive plastic molds can be fabricated and shipped to the filter construction site where they are filled with concrete, cured, and then placed in the filter unit to provide an underdrain system. The underdrain blocks may be equipped with handholds to facilitate the handling and placement of the blocks in the filter vessel. The blocks may also be provided with alternating vertical rigs on the outside vertical surfaces of the plastic jacket which create an interlocking system whereby when installed in the filter unit each block is interconnected to its adjacent side blocks thereby creating a uniform interconnected filter underdrain system which resists the uplifting and displacement of individual blocks during backwashing operations.

16 Claims, 3 Drawing Sheets

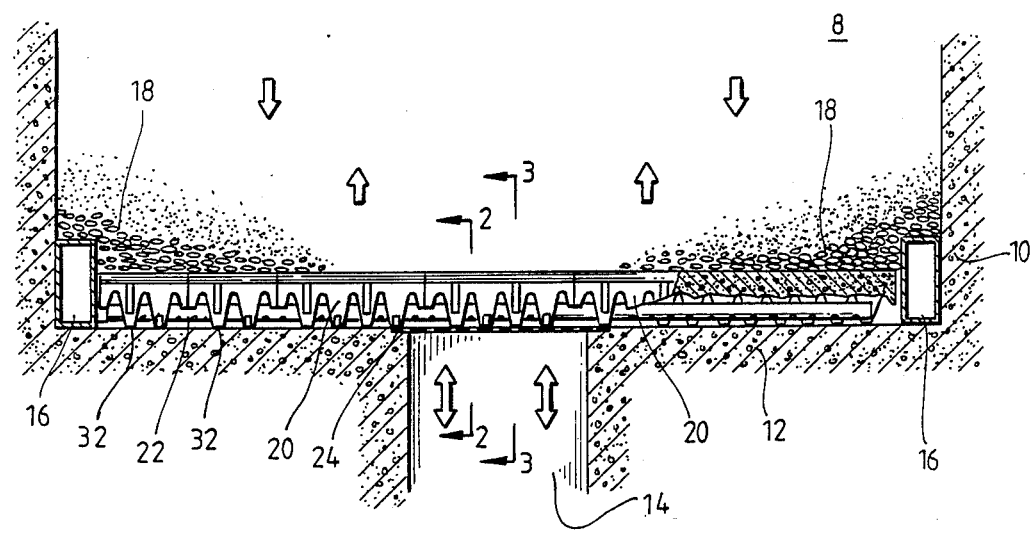
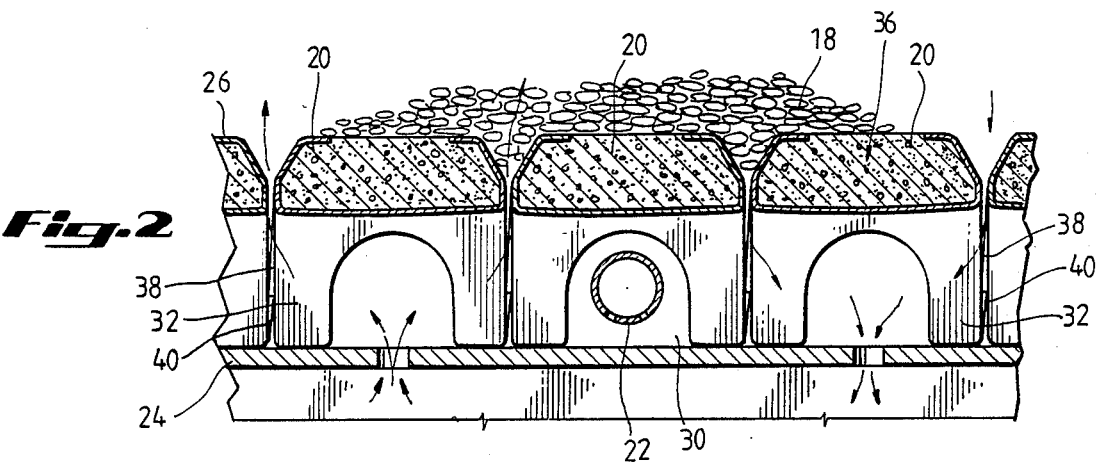
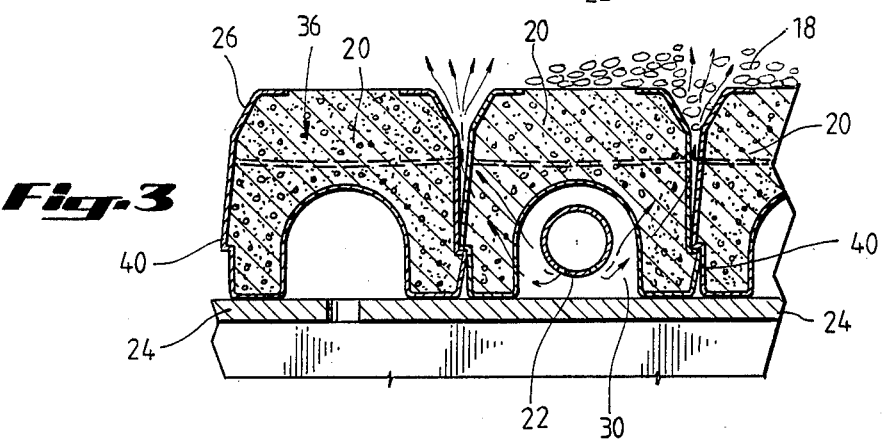

4,923,606

PLASTIC-JACKETED FILTER UNDERDRAIN BLOCK

BACKGROUND OF THE INVENTION

1. Field of the Invention

This invention relates to apparatus for water and wastewater treatment. More specifically, the invention relates to filter underdrain blocks used to provide even distribution of liquid and gas during filter backwashing operations and also the uniform collection of filtered water during the normal operation of filtration units.

2. Description of the Related Art

It is desirable to provide water and wastewater filtration units with a means for supporting the filter media such that the filter media is spaced apart from the bottom of the filter. This provides a space for the pipes which comprise that portion of the backwash air distribution system which is situated below the filter media. It also physically separates the filter media from the air distribution pipes. This helps prevent clogging of the orifices in the pipes by the finer particles of the filter media as well as removing the weight load of the overlying filter media from the pipes. Physical abrasion of the pipes is also avoided in this type of filter apparatus inasmuch as the gravel of the filter media is not in contact with the walls of the pipes. During backwashing operations the particles comprising the filter media tend to move about to some extent in response to the force of backwash air and water flows. If the filter media is in direct physical contact with the backwash air distribution pipes the pipes will be subjected to the abrasive action of the moving filter media (typically gravel and sand). Such abrasion shortens the useful life of the air distribution system.

Prior to the present invention, one of the most effective means for supporting filter media in the manner described above was to equip the filter with precast concrete underdrain blocks. These are specially designed blocks cast using high-strength concrete which are placed side-by-side and end-to-end in the bottom of a filter so as to form a "false bottom" which provides a support for the filter media. The blocks have legs such that when the blocks are placed on the bottom surface of the filter, passages are provided for the air distribution pipes between the legs of the blocks.

In the past, such filter underdrain blocks had to be cast in metal molds which must be partially disassembled to remove the block after the concrete was sufficiently cured and then reassembled to cast the next block. The molds themselves were expensive and the production of such filter underdrain blocks in commercial quantities required the use of multiple molds inasmuch as one had to wait for the concrete to set on one block before that mold became available to cast another block. A typical cycle time for such a mold is 24 hours. Moreover, once the blocks were cast at the casting facility they had to be shipped to the filter construction site for use. This was expensive since the blocks are heavy and it subjects the blocks to potential damage during shipment and associated handling.

SUMMARY OF THE INVENTION

The present invention comprises a precast, plastic-jacketed filter underdrain block. The plastic jacket additionally functions as a mold for the concrete. Thus, relatively lightweight, inexpensive plastic molds can be fabricated and shipped to the filter construction site where they are filled with concrete and then placed in the filter unit. The plastic molds become an integral part of the finished filter underdrain block.

In one preferred embodiment, the underdrain blocks are equipped with handholds which facilitate the handling and placement of the blocks in the filter vessel. The blocks may also be provided with alternating vertical ribs on the outside vertical surfaces of the plastic jacket which create an interlocking system whereby each block is interconnected to its adjacent side blocks thereby creating a uniform interconnected filter underdrain system which resists the uplifting of individual blocks during backwashing operations.

BRIEF DESCRIPTION OF THE DRAWINGS

FIG. 1 is a partially sectioned cross-sectional view of the lower portion of a typical gravity filter unit which employs the present invention to provide a filter underdrain system.

FIG. 2 is a cross-sectional view of the plastic-jacketed filter underdrain blocks of the present invention taken along line "2—2" in FIG. 1.

FIG. 3 is a cross-sectional view of the plastic-jacketed filter underdrain blocks of the present invention taken along line "3—3" in FIG. 1.

DETAILED DESCRIPTION

Figure 4:
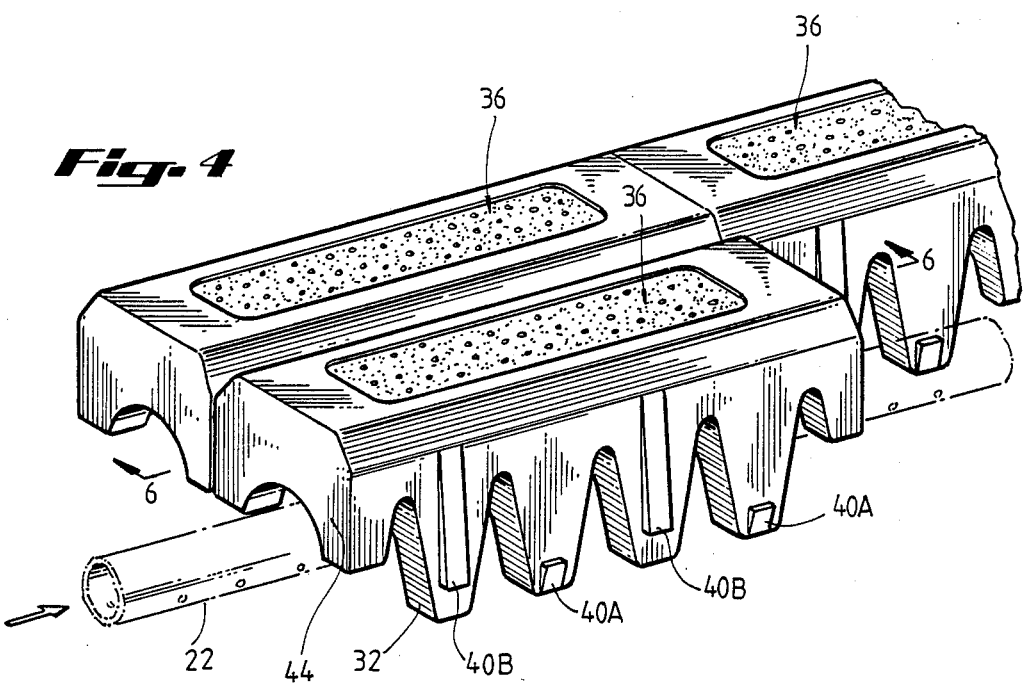
FIG. 4 is a perspective view of the filter underdrain blocks. Also shown in FIG. 4 is a backwash air distribution pipe, space for which is provided by the configuration of the lower portion of the filter underdrain blocks.

The present invention comprises a combination plastic jacket and concrete mold for filter underdrain blocks. The invention encompasses precast filter underdrain blocks which incorporate the mold as a plastic jacket.

The plastic-jacketed precast blocks of the present invention can be used to provide a filter underdrain system for upflow and downflow filtration units which provides even distribution of liquid (usually water) and gas (usually compressed air) during backwashing operations and also provides for the uniform collection of filtered water during normal operation of the filtration unit.

The precast filter blocks are designed to:

(1) support the filter media while creating a chamber between the media and the effluent collection system for housing the backwash air distribution system, as well as provide for the even distribution of the backwash water and backwash air, and the uniform collection of filtered water;

(2) be relatively lightweight and compact thereby permitting simple and rapid installation;

(3) have sufficient strength to withstand the pressures created during filter operation and to avoid problems with breakage during installation and handling;

(4) reduce head losses during operation of the filter unit by providing a smooth exterior surface;

(5) be easily produced in bulk thereby reducing manufacturing costs while maintaining accurate and consistent overall dimensions; and, (6) in one preferred embodiment, interlock to prevent lifting of individual blocks during the backwash cycle.

The size and shape of the precast block makes it easy to handle and install by one person. The plastic mold is filled with high strength (5000 psi) concrete. The smooth exterior surfaces of the plastic mold which becomes an integral part of the finished block greatly reduces the coefficient of friction on the block surface thereby minimizing head losses across the blocks during both filtration and backwashing operations. The plastic jacket remains on the filter underdrain block after the concrete has cured and it becomes an integral part of the block. The plastic jacket/mold can be manufactured to exact overall dimensions and uniformity can readily be maintained from jacket to jacket thereby maintaining dimensional stability and block uniformity.

In one preferred embodiment, the plastic jacket/molds are provided with alternating vertical ribs on the outside vertical surfaces. This creates an interlocking system whereby each block may be interconnected to adjacent side blocks thereby creating a uniform interconnected filter underdrain system which resists uplifting and displacement of individual blocks under the influence of backwash air and water flows.

In the illustrated embodiment, hand grips are incorporated into each end of the jacket/mold. This enables the finished blocks to be handled easily and reduces the chances of dropping and breaking the blocks during installation.

It has been found that blocks cast with 5000 psi concrete in the jacket/molds of the present invention easily withstand the operating pressures and filter media load of typical wastewater treatment filters. The blocks require no reinforcing material inasmuch as the loads experienced by the blocks during operation are compressive. Reinforcing members such as steel rods or wire could, of course, be easily incorporated by installing them in the mold through the top opening prior to filling the jacket/mold with concrete.

The preferred aggregate for the concrete used to cast the filter underdrain blocks is a gravel in the ¼ by ⅜-inch sieve size. Such an aggregate is sometimes referred to as Ohio State Highway Department #8 aggregate.

The concrete mix is preferably 1.5 parts by volume portland cement, 2 parts by volume sand, and 3 parts by volume gravel of the above-mentioned type. A plasticizer may be incorporated to fluidize the concrete for pouring. An appropriate plasticizer has been found to be DAREX brand plasticizer WRDA-19 manufactured by W. R. Grace & Company. The manufacturer's instructions should be followed concerning dosage and mixing. It has been found to be advantageous to vibrate the plastic mold/jackets as they are filled to ensure that no voids remain within the mold.

EXAMPLE 1

Figure 7C:
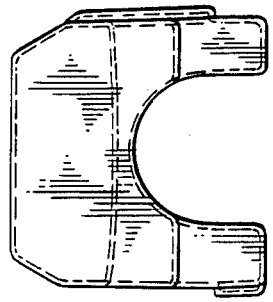
FIG. 7 shows the dimensions (in inches) of one preferred embodiment of the filter underdrain blocks of the present invention.
Figure 7B:
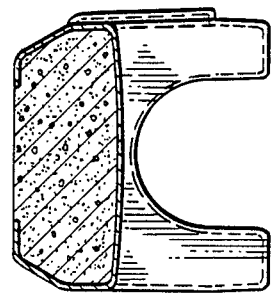
Figure 7:
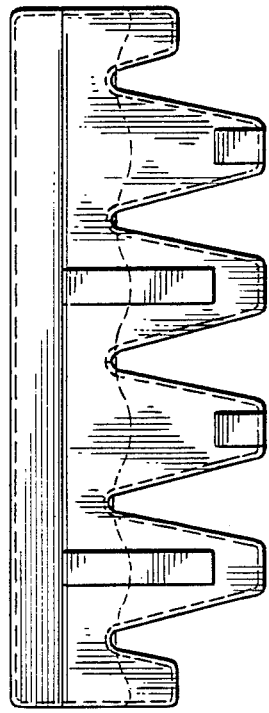
Figure 7A:
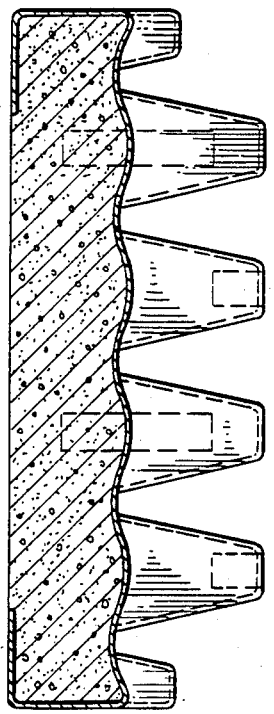

A strength test was performed using plastic-jacketed blocks of the present invention having the dimensions shown in FIG. 7. The blocks were cast with 5000 psi concrete mix. The concrete was allowed to cure for not less than seven days. The blocks weighed approximately 50 pounds each. Initial failure was indicated to occur at an average load of 76,000 pounds (average of three tests). Total failure required an average load of 83,500 pounds (three tests).

EXAMPLE 2

The test described in Example 1 was repeated using the non-jacketed blocks of the prior art—i.e., precast concrete air/water distribution blocks produced using steel molds. The design of these blocks is illustrated in FIG. 2 on page 2 of a brochure entitled "Deep-Bed Filter Systems" (4M-6/86) put out by Tetra Technologies, Inc., One Thorn Run Center, 1187 Thorn Run Extension, Corapollis, Pa. 15108; a division of Tetra Resources, Inc.), the contents of which are incorporated by reference. The overall dimensions of the blocks tested were 8 inches (width) by 12 inches (length). The same concrete mix and curing time was used as in Example 1. Initial failure was indicated to occur at an average load of 20,600 pounds (three tests) and total failure occurred at an average load of 47,600 pounds (three tests).

The preferred plastic for the jacket/molds is high density polyethylene. It requires approximately 2.35 pounds of plastic to produce a jacket/mold of the present invention having the dimensions shown in FIG. 7. The illustrated embodiment may be produced in a single cavity injection mold. At present, rotational molded jacket/molds are preferred. It is contemplated that blow molding could be used to produce the plastic jacket/molds of the present invention.

The use of the filter underdrain blocks of the present invention to provide an underdrain system at the bottom of a filtration unit 8 is shown in FIG. 1. Filtration unit 8 comprises a vessel comprising side walls 10 and bottom 12. A sump 14 is provided for the collection of filtrate during normal filter operation (flow direction indicated by the downward-pointing arrows) and for the supply of backwash water during backwashing operations (flow indicated by the upward-pointing arrows). Sump 14 is provided at its upper extreme with perforate plate 24 which supports the blocks situated over the sump. Backwash air is supplied via headers 16 to perforate conduit 22. Filter media 18 is supported by filter underdrain blocks 20 which additionally provide a passage, chamber, or space 30 between block legs 32.

A portion of the array of blocks comprising the filter underdrain system is shown in cross section in FIG. 2. The section is taken through line "2—2" in FIG. 1. This is a section through a portion of the block between an opposing pair of legs 32. Plastic jacket/mold 26 as well as concrete fill 36 can be seen in this cross-sectional view. It should be noted that the blocks are spaced apart to create gap 38 which provides for air and water flow past the blocks. Gap 38 is preferably about ¼ inch. In one preferred embodiment, interlocking lugs 40 are sized to provide the desired size of gap 38 when the blocks are positioned such that lugs 40 are in contact with the sides of the adjacent blocks.

FIG. 3 is a cross-sectional view similar to FIG. 2 but taken along line "3—3" in FIG. 1. Thus, this view is taken through an opposing pair of legs 32 having interlocking lugs 40.

FIG. 4 is a perspective view showing how the blocks are arranged in an interlocking array to provide a filter underdrain system. The interlocking system is provided by the engagement of lower lugs 40A with upper lugs 40B. The legs 32 are provided with alternating lug types such that any block will interlock with its neighboring side blocks. Handhold 44 is also shown in FIG. 4.

Figure 5:
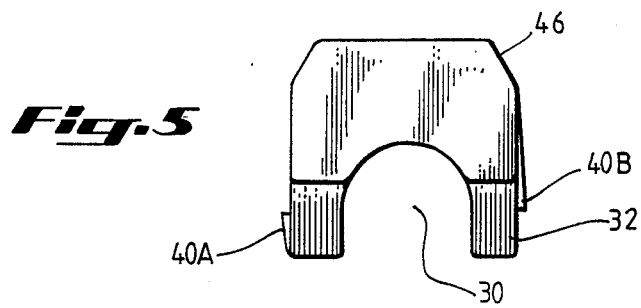
FIG. 5 is an end view of a filter underdrain block of the present invention.

FIG. 5 is an end view of an embodiment of the present invention which incorporates interlocking lugs 40.

Also shown in this figure is bevel 46 which provides a channel for water into the gap 38 between adjacent blocks during normal downflow operation of the type of filter illustrated.

Figure 6:
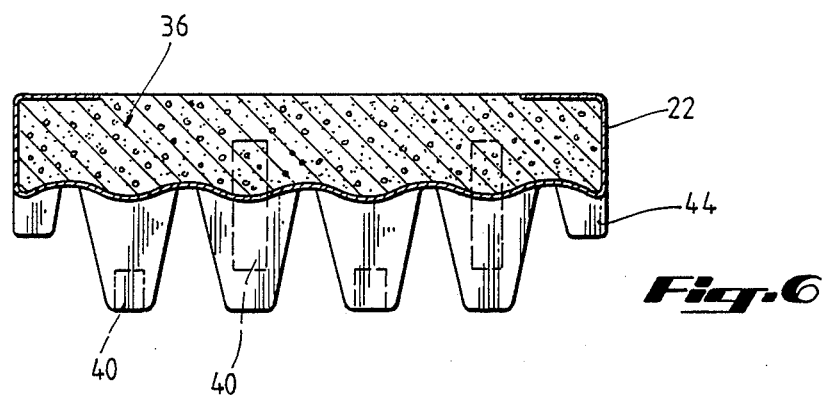
FIG. 6 is a cross-sectional view of a plastic-jacketed filter underdrain block of the present invention taken along line "6—6" in FIG. 4.

FIG. 6 is a longitudinal cross-sectional view taken along line "6—6" in FIG. 4. This section is taken along the center line of the block between the opposing rows of legs. The handhold 44 provided at each end of the block may be seen in this figure.

The foregoing description has been directed to particular embodiments of the invention in accordance with the requirements of the United States patent statutes for the purposes of illustration and explanation. It will be apparent to those skilled in this art, however, that many modifications and changes in the apparatus and methods set forth will be possible without departing from the scope and spirit of the invention. It is intended that the following claims be interpreted to embrace all such modifications and changes.

What is claimed is:

1. A combination mold and jacket for a filter underdrain block, including support legs and opposite ends and sides, comprising a hollow plastic member preferred to form the jacket of a filter underdrain block, shaped to provide for the passage of fluid between said support legs, and defining an opening for receiving a castable fill material.

2. The mold and jacket of claim 1 wherein the hollow plastic member includes a plurality of hollow, laterally spaced legs arranged to define a passage between said legs and extending from one end of the plastic member to the other end.

3. The mold and jacket of claim 1, wherein at least one of said ends comprises a handhold.

4. The mold and jacket of claim 1, wherein at least one of said sides comprises a spacer lug.

5. The mold and jacket of claim 4, in which each side of the hollow plastic member has at least one said lug having an upward facing surface and at least one said lug having a downward facing surface, said lugs being arranged such that each downward facing lug of a first hollow plastic member abuts an upward facing lug of a second hollow plastic member placed alongside the first hollow plastic member to resist relative lifting movement between the two hollow plastic members.

6. The mold and jacket of claim 1 further comprising a castable filling material cast within and filling said hollow plastic member.

7. A filter underdrain block comprising:
a single-piece, hollow plastic jacket and a filler material cast within said jacket, wherein said plastic jacket has a top surface, a bottom surface, and end and side surfaces; and said top surface defines an opening for receiving said filler material in castable form; and said bottom surface is shaped to define a passage along said jacket.

8. A filter underdrain block as recited in claim 7, wherein the filler material is high strength concrete.

9. An underdrain system for filtering waste water, comprising filter media and an array of underdrain blocks for supporting the filter media, wherein each said block comprises:
a single unitary preformed plastic mold shaped to provide for the flow of fluid under the mold, and having an opening for receiving uncured filler material; and
cured filler material which fills at least a portion of said single unitary preformed plastic mold.

10. An underdrain system as recited in claim 9, wherein the blocks include means for interconnecting the blocks.

11. A combination mold and jacket for a filter underdrain block, comprising:
a first hollow plastic member having a top surface, a bottom surface, two end surfaces, and two side surfaces;
said top surface defining a hole for receiving a castable filling material within the first hollow plastic member; and
said bottom surface including two rows of legs laterally spaced to define a passage between said rows extending from one said end surface of the first plastic member to the other said end surface of the first plastic member.

12. The combination mold and jacket of claim 11 in which the top surface is beveled downward along each side of the first plastic member.

13. The combination mold and jacket of claim 12 comprising at least one lug projecting from each said side surface to space the first plastic member from a second said plastic member placed alongside the first plastic member.

14. The combination mold and jacket of claim 13 in which two said lugs project from each said side surface of said first plastic member, and at least one of said lugs on each said side surface has an upward facing surface and at least one of the lugs on each said side surface has a downward facing surface, said lugs on each said side surface being arranged such that each said upward facing surface interlocks with a said downward facing surface of another such plastic member, and each said downward facing surface interlocks with a said upward facing surface of said another such plastic member, when said first plastic member and said another plastic member are placed side by side.

15. The combination mold and jacket of claim 14 which further comprises a castable filling material cast within said first plastic member.

16. The combination mold and jacket of claim 15 in which the filling material is concrete.

* * * * *

UNITED STATES PATENT AND TRADEMARK OFFICE
CERTIFICATE OF CORRECTION

PATENT NO. : 4,923,606

DATED : May 8, 1990

INVENTOR(S) : Richard D. Gresh and Robert B. Netherland

It is certified that error appears in the above-identified patent and that said Letters Patent is hereby corrected as shown below:

In column 5, lines 24 and 25, change "preferred" to -- preformed --.

Signed and Sealed this

Twenty-first Day of April, 1992

Attest:

HARRY F. MANBECK, JR.

*Attesting Officer*    *Commissioner of Patents and Trademarks*